United States Patent
Kobayashi et al.

(10) Patent No.: US 9,900,534 B2
(45) Date of Patent: Feb. 20, 2018

(54) IMAGE PICKUP APPARATUS, IMAGE PICKUP SYSTEM AND METHOD FOR DRIVING IMAGE PICKUP APPARATUS

(71) Applicant: CANON KABUSHIKI KAISHA, Tokyo (JP)

(72) Inventors: Hideo Kobayashi, Tokyo (JP); Kazuo Yamazaki, Yokohama (JP); Kei Ochiai, Inagi (JP); Masaki Sato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/372,090

(22) Filed: Dec. 7, 2016

(65) Prior Publication Data

US 2017/0171489 A1 Jun. 15, 2017

(30) Foreign Application Priority Data

Dec. 10, 2015 (JP) ................................ 2015-241382

(51) Int. Cl.
*H04N 5/374* (2011.01)
*H04N 5/3745* (2011.01)
*H04N 5/378* (2011.01)

(52) U.S. Cl.
CPC ......... *H04N 5/37455* (2013.01); *H04N 5/378* (2013.01)

(58) Field of Classification Search
CPC ........ G01J 1/44; G01J 2001/444; H04N 5/32; H04N 5/33355; H04N 5/3535; H04N 5/355; H04N 5/357; H04N 5/363; H04N 5/3742; H04N 5/37455; H04N 5/378
See application file for complete search history.

(56) References Cited

U.S. PATENT DOCUMENTS

| | | | |
|---|---|---|---|
| 9,602,752 B2* | 3/2017 | Kobayashi | H04N 5/378 |
| 2003/0214591 A1* | 11/2003 | Kakumoto | H04N 5/3653 |
| | | | 348/243 |
| 2011/0080510 A1* | 4/2011 | Nishihara | H04N 5/32 |
| | | | 348/308 |
| 2013/0286265 A1* | 10/2013 | Ogata | H04N 5/335 |
| | | | 348/294 |
| 2014/0043511 A1* | 2/2014 | Iwata | H04N 5/3698 |
| | | | 348/308 |
| 2015/0009386 A1* | 1/2015 | Komaba | H03M 1/56 |
| | | | 348/308 |
| 2016/0014363 A1* | 1/2016 | Kito | H04N 5/378 |
| | | | 348/308 |

FOREIGN PATENT DOCUMENTS

| | | |
|---|---|---|
| JP | 2008-67358 A | 3/2008 |
| JP | 2015-032943 A | 2/2015 |

* cited by examiner

*Primary Examiner* — Amy Hsu
(74) *Attorney, Agent, or Firm* — Canon USA, Inc., IP Division

(57) ABSTRACT

A signal based on a pixel signal of a first pixel sampled by a capacitor element is held by a signal holding unit with a switch left turned on.

20 Claims, 8 Drawing Sheets

IMAGE PICKUP APPARATUS, IMAGE PICKUP SYSTEM AND METHOD FOR DRIVING IMAGE PICKUP APPARATUS

BACKGROUND OF THE INVENTION

Field of the Invention

The aspect of the embodiments relates to an image pickup apparatus, an image pickup system and a method for driving an image pickup apparatus.

Description of the Related Art

An image pickup apparatus has been known in which a plurality of pixels is arranged over a plurality of rows and a plurality of columns.

In addition, there is an image pickup apparatus which includes a signal holding unit which holds a signal output by a pixel and an AD conversion unit which converts the signal held by the signal holding unit to a digital signal, such as that described in Japanese Patent Laid-Open No. 2008-67358. A switch is provided in an electrical path between the signal holding unit and the pixel. The signal holding unit holds a signal output by the pixel by the switch being brought into a non-conductive state after it has been in a conductive state.

SUMMARY OF THE INVENTION

A first aspect of the embodiments is an image pickup apparatus comprising: a plurality of pixels, each of the pixels being configured to output a pixel signal to a signal line; a capacitor element; a signal holding unit; a switch having one node connected to the signal line and another node connected to the capacitor element and the signal holding unit, wherein the capacitor element samples the pixel signal when the switch is turned on, and holds the pixel signal output when the switch is turned off, the pixel signal of a first pixel among the pixels is output to the signal line, and a signal based on the pixel signal of the first pixel sampled by the capacitor element by turning the switch on is held by the signal holding unit with the switch left turned on. In addition, another aspect of the embodiments is a method for driving an image pickup apparatus, the image pickup apparatus comprising: a plurality of pixels, each of the pixels being configured to output a pixel signal to a signal line; a capacitor element; and a signal holding unit configured to hold a signal based on the pixel signal, in which the capacitor element is capable of sampling the pixel signal and holding the pixel signal, in the method a first pixel among the pixels outputs the pixel signal to the signal line, and in a period during which the capacitor element samples the pixel signal of the first pixel, the signal holding unit holds a signal based on the pixel signal of the first pixel.

Further features of the disclosure will become apparent from the following description of exemplary embodiments (with reference to the attached drawings).

DESCRIPTION OF THE EMBODIMENTS

In the image pickup apparatus of Japanese Patent Laid-Open No. 2008-67358, a noise generated by a conduction or non-conduction operation of a switch is superimposed onto a signal output by a pixel. Consequently, a noise included in a signal held by a signal holding unit increases, which can be an issue.

The embodiments described below relate to technology for reducing a noise included in a signal held by a signal holding unit.

Hereinbelow, each embodiment will be described with reference to the drawings.

First Embodiment

Figure 1:
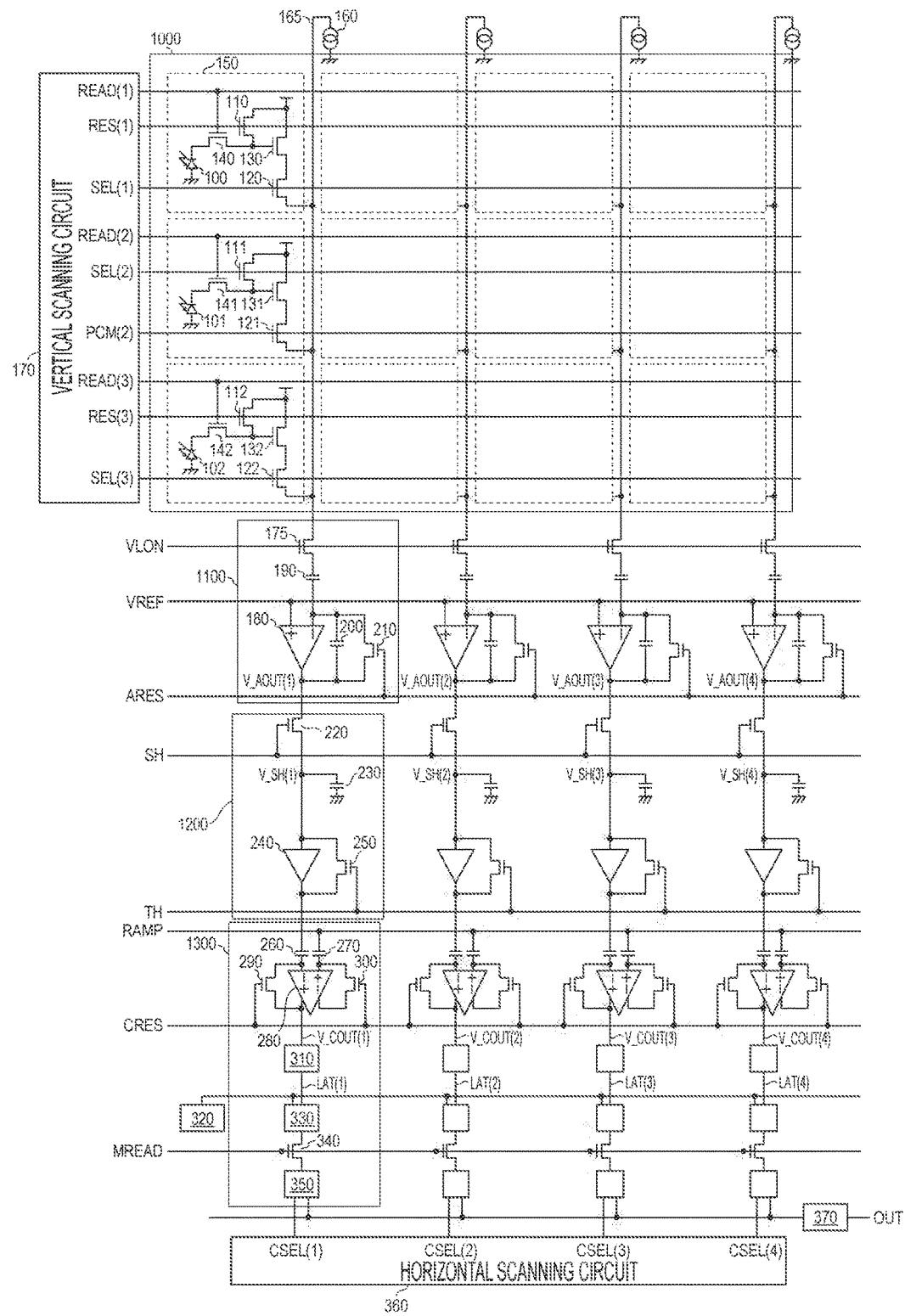
FIG. 1 illustrates an example of a configuration of an image pickup apparatus.

FIG. 1 illustrates a configuration of an image pickup apparatus of a first embodiment. The image pickup apparatus includes a pixel array 1000, an amplifying circuit 1100, a sampling and holding unit 1200, and an AD conversion unit 1300. The image pickup apparatus further includes a current source 160, a vertical scanning circuit 170, a counter 320, and a horizontal scanning circuit 360.

The pixel array 1000 includes pixels 150 arranged over a plurality of rows and a plurality of columns. Each pixel 150 includes a photodiode 10$p$, a reset transistor 11$p$, a selection transistor 12$p$, an amplifying transistor 13$p$, and a transfer transistor 14$p$. In the above, p is a number obtained by subtracting 1 from the number of the row where the pixel is located. The photodiode 10$p$ is a photoelectric conversion unit which generates charge based on light. The transfer transistor 14$p$ and the photodiode 10$p$ are connected to an input node of the amplifying transistor 13$p$. A signal READ (n) is input to a gate of the transfer transistor 14$p$ from the vertical scanning circuit 170. What is meant by (n) is that the signal output by the vertical scanning circuit 170 is input to a pixel 150 located in the n-th row. One node of the reset transistor 11$p$ is connected to the input node of the amplifying transistor 13$p$, and a power supply voltage is input to another node thereof. A signal RES(n) is input to a gate of the reset transistor 11$p$ from the vertical scanning circuit 170. One node of the amplifying transistor 13$p$ is connected to the selection transistor 12$p$, and the power supply voltage is input to another node thereof. One node of the selection transistor 12$p$ is connected to the amplifying transistor 13$p$, and another node thereof is connected to a vertical signal line 165. A signal SEL(n) is input to a gate of the selection transistor 12$p$ from the vertical scanning circuit 170. The vertical signal line 165 is connected to the current source 160 and a switch 175 included in the amplifying circuit 1100. When a signal PSEL(n) transitions to High, the selection transistor 12$p$ is turned on. Consequently, a current supplied by the current source 160 is input to the amplifying transistor 13$p$ through the selection transistor 12$p$. The amplifying transistor 13$p$ outputs a pixel signal, which is a signal based on a potential of the input node, to the vertical signal line 165 through the selection transistor 12$p$. The amplifying transistor 13$p$ performs a source follower operation with the power supply voltage and the current source 160. In other words, the power supply voltage, the current source 160, and the amplifying transistor 13p constitute a source follower circuit.

The amplifying circuit 1100 includes the switch 175, a capacitor element 190, an amplifier 180, a capacitor element 200, and a switch 210. The switch 175 is controlled by a signal VLON input from a timing generator (not illustrated). The switch 210 is controlled by a signal ARES input from the timing generator (not illustrated). The amplifier 180 outputs a signal obtained by amplifying an input signal at a gain represented by "a capacitance value of the capacitor element 190/a capacitance value of the capacitor element 200" to a switch 220 included in the sampling and holding unit 1200.

The sampling and holding unit 1200 includes the switch 220, a capacitor element 230, a buffer 240, and a switch 250. The switch 220 is controlled by a signal SH input from the timing generator (not illustrated). The switch 250 is controlled by a signal TH input from the timing generator (not illustrated). The capacitor element 230 holds a signal based on a signal output by the pixel 150 by the switch 220 being brought into a non-conductive state after it has been in a conductive state. One node of the capacitor element 230 is connected to the switch 220. The one node of the capacitor element 230 is connected to a first memory 330 as a signal holding unit through the buffer 240, a capacitor element 260, a comparator 280, and a latch 310. A ground voltage as a reference voltage is input to another node of the capacitor element 230. The buffer 240 buffers an input signal and outputs the signal to the capacitor element 260 included in the AD conversion unit 1300. Output of the amplifying circuit 1100 is represented by "output V_AOUT(m)." What is meant by (m) is that the amplifying circuit 1100 is an amplifying circuit 1100 located in the m-th column.

The AD conversion unit 1300 includes the capacitor element 260, a capacitor element 270, the comparator 280, a switch 290, a switch 300, the latch 310, the first memory 330, a switch 340, and a second memory 350.

One input node of the comparator 280 is connected to the capacitor element 260. Another input node of the comparator 280 has the capacitor element 270. A ramp signal RAMP is input to the capacitor element 270 from a ramp signal supply unit (not illustrated). Each of the switch 290 and the switch 300 is controlled by a signal CRES output from the timing generator (not illustrated). Output V_COUT(m) of the comparator 280 is input to the latch 310. What is meant by (m) is that the signal is output by a comparator 280 located in the m-th column. When receiving the output V_COUT(m) from the comparator 280, the latch 310 outputs a signal LAT(m) to the first memory 330.

The counter 320 generates a count signal by counting a clock signal. The count signal output by the counter 320 is input to the first memory 330.

The switch 340 is controlled by a signal MREAD input from the timing generator (not illustrated). When the switch 340 is turned on, the second memory 350 holds a signal held by the first memory 330.

The horizontal scanning circuit 360 sequentially scans the second memories 350 of respective columns, thereby reading, from the second memories 350 of respective columns, the signal held by the second memory 350 to an output unit 370.

The output unit 370 outputs the signal output from the second memory 350 outside the image pickup apparatus.

Next, an operation of a comparative example which uses the configuration of the image pickup apparatus in FIG. 1 will be described.

Figure 2A:
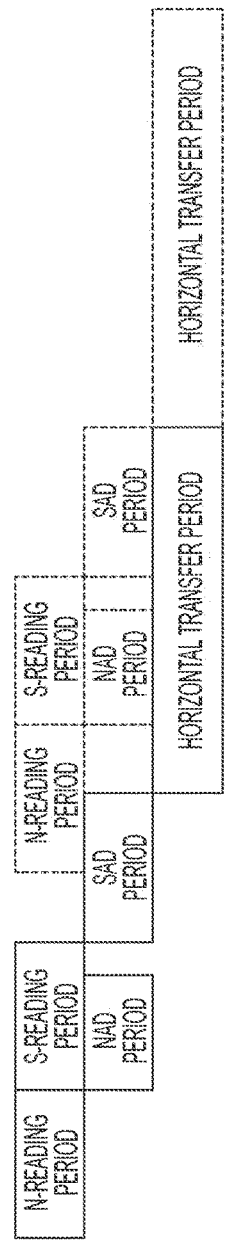
FIGS. 2A and 2B respectively illustrate examples of operations of another image pickup apparatus and the image pickup apparatus.

FIG. 2A illustrates the operation of the comparative example. In the operation illustrated in FIG. 2A, a NAD period and an S-reading period are overlapped. In addition, a SAD period and an N-reading period of the pixel 150 in the next row are overlapped.

Figure 3:
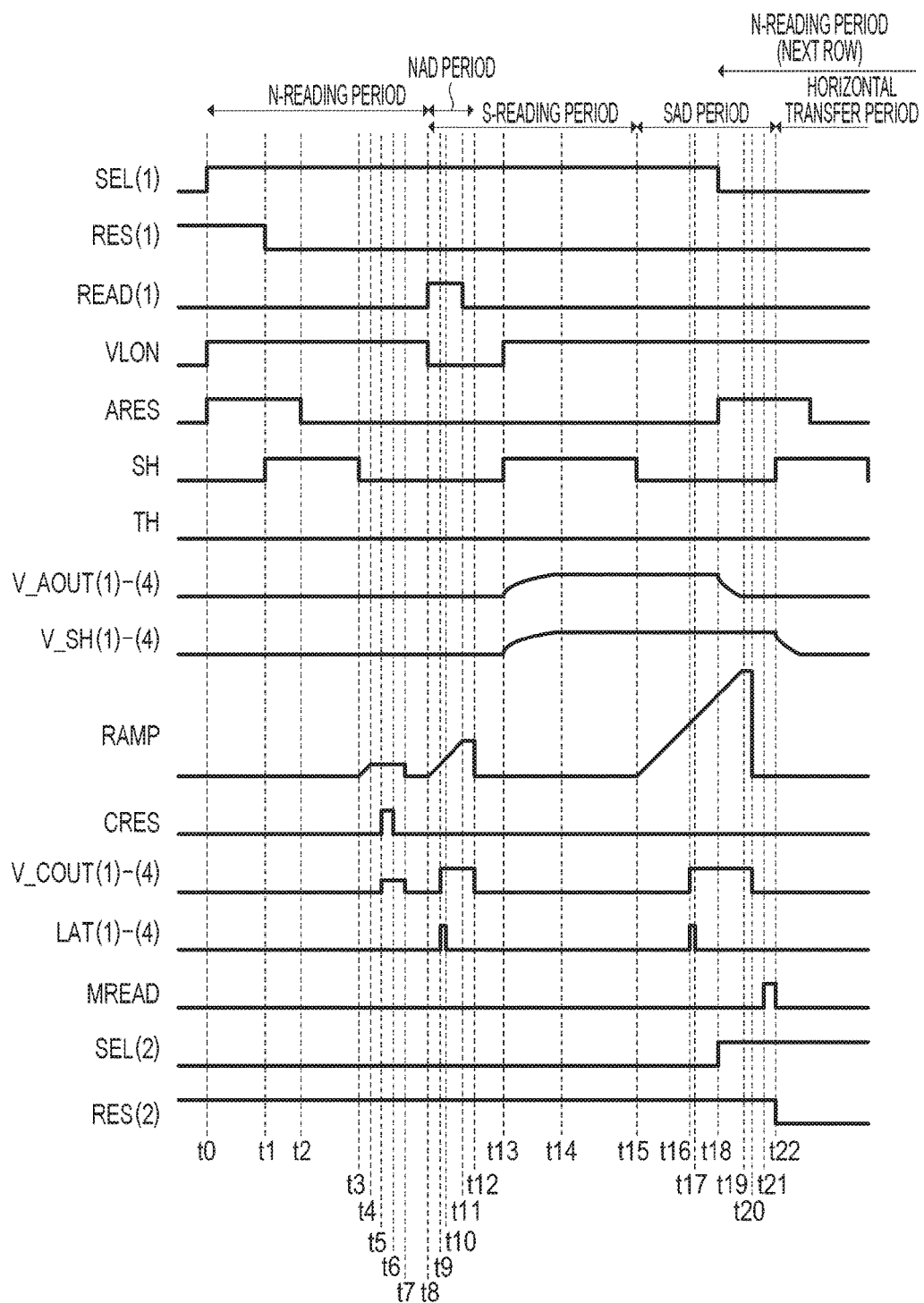
FIG. 3 illustrates an example of the operation of the other image pickup apparatus.

Details of the operation illustrated in FIG. 2A are illustrated in FIG. 3.

A period from time t0 to time t8 illustrated in FIG. 3 is the N-reading period illustrated in FIG. 2A.

At time t0 in FIG. 3, the vertical scanning circuit 170 makes a signal SEL(1) transition to High. Consequently, a signal is output to the vertical signal line 165 from the pixel 150 in the first row.

At time t1 in FIG. 3, the vertical scanning circuit 170 makes a signal RES(1) transition from High to Low. Consequently, the input node of the amplifying transistor 13p has a potential after reset. Consequently, the amplifying transistor 130 of the pixel 150 in the first row outputs a signal based on the reset potential of the input node to the vertical signal line 165. This signal is referred to as an N signal. The N signal is one of pixel signals output by the pixel 150, and a noise signal output by the pixel 150.

At time t2, which is in a period during which the pixel 150 outputs the N signal, the timing generator (not illustrated) makes the signal ARES transition from High to Low. Consequently, the N signal is clamped by the capacitor element 190.

The amplifying circuit 1100 outputs an OFFSET signal, which is a signal at an offset level, from time t2. The signal is referred to as an offset signal. The OFFSET signal is a signal based on a noise signal, which is one of pixel signals. Since the timing generator (not illustrated) has made the signal SH transition to High, the capacitor element 230 samples the OFFSET signal.

Thereafter, at time t3, the timing generator (not illustrated) makes the signal SH transition to Low. Consequently, the capacitor element 230 holds the OFFSET signal.

The OFFSET signal held by the capacitor element 230 is input to the buffer 240. The buffer 240 outputs a signal obtained by buffering the OFFSET signal to the comparator 280 through the capacitor element 260.

At that time, the potential of the ramp signal RAMP is set to a ramp start potential.

Thereafter, at time t3 to time t4, the ramp signal supply unit offsets the potential of the ramp signal RAMP.

At time t6, the timing generator (not illustrated) changes the signal CRES from High to Low. The capacitor element 260 clamps the OFFSET signal. In addition, the capacitor element 270 clamps the offset potential of the ramp signal RAMP.

The N-reading period is a period from when the pixel 150 starts outputting the N signal to when the ramp signal RAMP starts changing the potential, which will be described later.

Next, the NAD period will be described.

By time t8, the ramp signal supply unit (not illustrated) sets the potential of the ramp signal RAMP to the ramp start potential. The ramp signal supply unit starts changing the potential of the ramp signal RAMP at the time t8.

The counter 320 starts counting the clock signals in response to the start of the change in the potential of the ramp signal RAMP. In accordance therewith, counting-up of the count signals is started.

The comparator 280 outputs the signal V_COUT(m) which indicates a result of comparison between potentials of an inverting input node and a non-inverting input node.

When a magnitude relationship between the potentials of the inverting input node and the non-inverting input node of the comparator 280 is reversed at time t9, a value of the signal V_COUT(m) changes.

When the value of the signal V_COUT(m) changes, the latch 310 makes the signal LAT(m) transition to High, and then to Low.

The first memory 330 holds a count signal generated at timing when the signal LAT(m) has transitioned from High to Low. The count signal is a digital signal based on a noise component of the comparator 280. The digital signal is referred to as a digital N signal. The digital N signal is a signal mainly including a component of variation between the comparators 280 in respective columns.

Thereafter, at time t11, the ramp signal supply unit (not illustrated) ends the change in the potential of the ramp signal RAMP. The counter 320 ends the counting of the clock signals. In accordance therewith, the counting-up of the count signals is ended.

The NAD period is a period from when the change in the potential of the ramp signal RAMP is started to when the change in the potential of the ramp signal RAMP is ended.

Thereafter, the timing generator makes the signal MREAD transition to High. Consequently, the second memory 350 holds the digital N signal held by the first memory 330. Consequently, it becomes possible to load a next count signal into the first memory 330.

In the operation in the comparative example in FIG. 2A, at least a part of the NAD period and a part of the S-reading period are overlapped. In an example described below, the entirety of the NAD period and a part of the S-reading period are overlapped.

The S-reading period will be described.

At time t7, the vertical scanning circuit 170 makes a signal PTX(1) transition to High. Accordingly, charge accumulated by a photodiode 100 is transferred to the amplifying transistor 130. The amplifying transistor 130 outputs a signal based on the charge accumulated by the photodiode 100 to the vertical signal line 165. This signal includes the N signal. This signal is referred to as an (S+N) signal. The (S+N) signal is one of the pixel signals output by the pixel 150. In addition, the (S+N) signal is an optical signal based on charge, output from the pixel 150.

At time t13, the timing generator (not illustrated) makes the signal VLON transition to High. The capacitor element 190 remains clamping the N signal. Therefore, an S signal, obtained by subtracting the N signal from the (S+N) signal is input to an input node of the amplifier 180.

The amplifier 180 outputs a signal based on the S signal. This signal includes a signal obtained by amplifying the S signal and an OFFSET signal of the amplifier 180. The signal based on the S signal is referred to as an (amplified S+OFFSET) signal.

At time t13, the timing generator (not illustrated) makes the signal SH transition to High. Consequently, the capacitor element 230 samples the (amplified S+OFFSET) signal. Thereafter, at time t15, the timing generator (not illustrated) makes the signal SH transition to Low. Consequently, the capacitor element 230 holds the (amplified S+OFFSET) signal.

The S-reading period is a period from when the pixel 150 starts outputting the (S+N) signal to when the ramp signal RAMP starts changing the potential, which will be described later.

Next, the SAD period will be described. During this period, the AD conversion unit 1300 converts the amplified S signal which is a signal based on the S signal to a digital signal.

At time t15, the capacitor element 230 holds the (amplified S+OFFSET) signal.

The (amplified S+OFFSET) signal held by the capacitor element 230 is input to the buffer 240. The buffer 240 outputs a signal obtained by buffering the (amplified S+OFFSET) signal to the comparator 280 through the capacitor element 260.

The capacitor element 260 continues clamping the OFFSET signal clamped in the previous NAD period. Therefore, the amplified S signal, obtained by subtracting the OFFSET signal from the (amplified S+OFFSET) signal, is input to the inverting input node of the comparator 280.

In addition, the capacitor element 270 is clamping the initial potential of the ramp signal RAMP clamped in the previous NAD period.

At time t15, the ramp signal supply unit starts changing the potential of the ramp signal RAMP.

The counter 320 starts counting the clock signals in response to the start of the change in the potential of the ramp signal RAMP. In accordance therewith, counting-up of the count signals is started.

The comparator 280 outputs the signal V_COUT(m) which indicates a result of comparison between potentials of the inverting input node and the non-inverting input node.

When a magnitude relationship between the potentials of the inverting input node and the non-inverting input node of the comparator 280 is reversed at time t16, a value of the signal V_COUT(m) changes.

When the value of the signal V_COUT(m) changes, the latch 310 makes the signal LAT(m) transition to High, and then to Low at time t17.

The first memory 330 holds a count signal generated at timing when the signal LAT(m) transitions from High to Low. The count signal is a digital signal based on the amplified S signal. The digital signal is referred to as a digital S signal.

At time t19, the ramp signal supply unit (not illustrated) ends the change in the potential of the ramp signal RAMP.

The SAD period is a period from when the change in the potential of the ramp signal RAMP is started to when the change in the potential of the ramp signal RAMP is ended.

Thereafter, at time t21, the timing generator (not illustrated) makes the signal MREAD transition to High. Consequently, the second memory 350 holds the digital S signal held by the first memory 330. Consequently, it becomes possible to load a next count signal into the first memory 330.

Thereafter, the horizontal scanning circuit 360 sequentially scans the second memories 350 of respective columns, thereby reading the digital S signals and the digital N signals from the second memories 350 of respective columns, to the output unit 370.

In the operation in the comparative example in FIG. 2A, a part of the SAD period and a part of the N-reading period of the pixel 150 in the next row are overlapped.

In the operation in the comparative example, driving is performed such that the switch 220 is turned off in order for the capacitor element 230 to hold the (amplified S+OFFSET) signal. There is a situation that a switching noise, which is generated by the switch 220 turned from on to off by the driving, is superimposed on the (amplified S+OFFSET) signal.

Figure 2B:
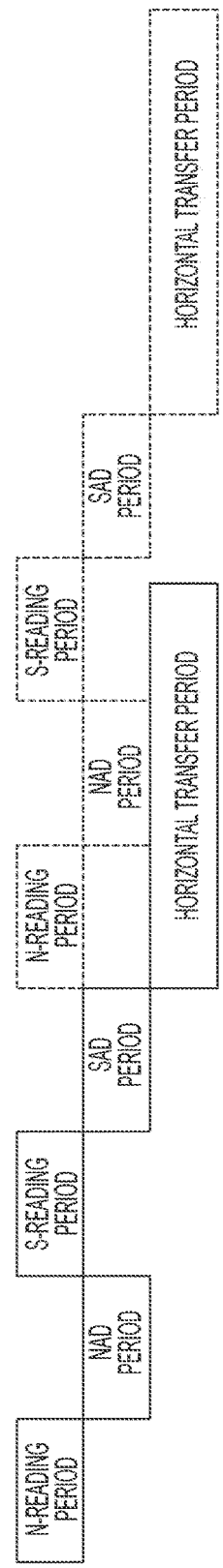

FIG. 2B illustrates driving of the embodiment.

A difference from the comparative example in FIG. 2A resides in that the NAD period and the S-reading period are not overlapped. Another difference therefrom resides in that the SAD period and the N-reading period are not overlapped.

Regarding the N-reading period of the embodiment, driving thereof which is different from that of the N-reading period of the comparative example will be described.

Figure 4:
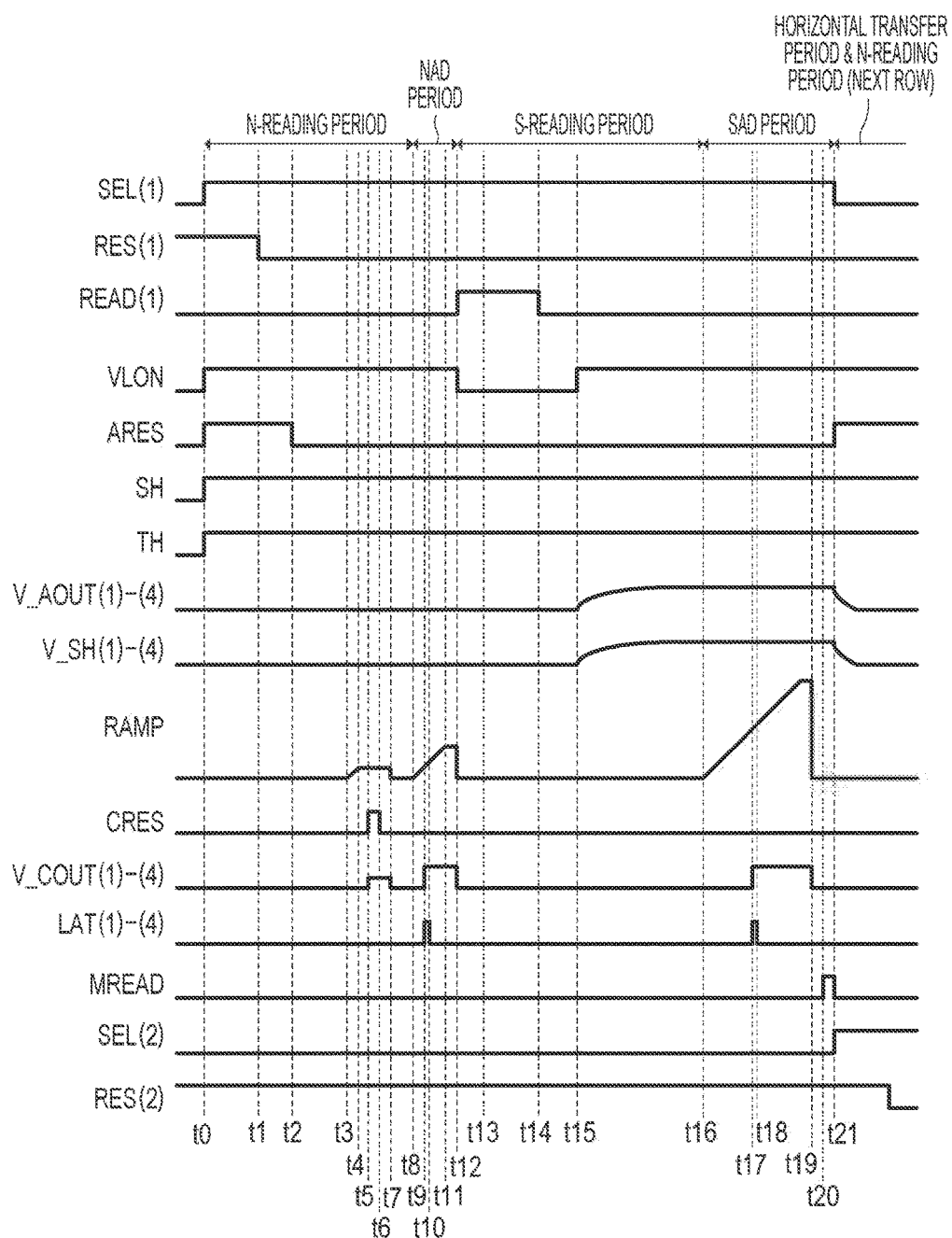
FIG. 4 illustrates an example of the operation of the image pickup apparatus.

FIG. 4 illustrates details of the driving of the embodiment illustrated in FIG. 2B.

In the N-reading period of the comparative example, the capacitor element 230 holds the OFFSET signal by the timing generator (not illustrated) making the signal SH transition from High to Low. In the embodiment, the timing generator (not illustrated) keeps the signal SH High from time t0. Consequently, the OFFSET signal continues to be input from the amplifier 180 to the comparator 280 through the buffer 240 from when the amplifier 180 starts outputting the offset signal to when the NAD period ends. During this period, the capacitor element 230 remains sampling the OFFSET signal. In the period during which the capacitor element 230 samples the offset signal, the first memory 330 holds a digital signal based on the OFFSET signal. Other operations are the same as the operations for the N-reading period described for the comparative example.

The operation for the NAD period in the embodiment is the same as the operation for the NAD period in the comparative example.

In the embodiment, the S-reading period starts after the NAD period ends.

Regarding the S-reading period in the embodiment, an operation thereof which is different from that of the S-reading period in the comparative example will be described. In the S-reading period in the comparative example, the capacitor element 230 holds the (amplified S+OFFSET) signal by the timing generator (not illustrated) making the signal SH transition from High to Low. In the embodiment, the signal SH remains High since time t0. Consequently, the (amplified S+OFFSET) signal continues to be input from the amplifier 180 to the comparator 280 through the buffer 240 from when the amplifier 180 starts outputting the (amplified S+OFFSET) signal to when the SAD period ends. During this period, the capacitor element 230 remains sampling the (amplified S+OFFSET) signal. In the period during which the capacitor element 230 samples the (amplified S+OFFSET) signal, the first memory 330 holds a digital signal based on the (amplified S+OFFSET) signal. Other operations are the same as the operations for the S-reading period described for the comparative example.

The operation for the SAD period in the embodiment is the same as the operation for the SAD period in the comparative example.

In the embodiment, the N-reading period of the pixel 150 in the next row starts after the SAD period ends.

In the operation in the embodiment, the switch 220 is left turned on from the start of the output of the (amplified S+OFFSET) signal to the end of the SAD period. The switch 220 is used in order for the capacitor element 230 as a signal holding capacitor to hold a signal. Consequently, the capacitor element 230 remains sampling the (amplified S+OFFSET) signal. In the period during which the capacitor element 230 samples the (amplified S+OFFSET) signal based on an S signal of a first pixel, the first memory 330 holds a digital signal corresponding to an amplified S signal based on the S signal of the first pixel. Consequently, it is less likely to include the noise generated by the switching of the switch 220 in the (amplified S+OFFSET) signal.

Accordingly, with the image pickup apparatus of the embodiment, it is possible to improve a signal/noise (S/N) ratio of the signal based on the S signal output by the pixel 150.

In addition, the switch 220 is left turned on from the start of the output of the offset signal to the end of the NAD period. The switch 220 is used in order for the capacitor element 230 as a signal holding capacitor to hold a signal. Consequently, the capacitor element 230 remains sampling the OFFSET signal. In the period during which the capacitor element 230 samples the OFFSET signal based on an N signal of the first pixel, the first memory 330 holds a digital signal corresponding to an OFFSET signal based on the N signal of the first pixel. Consequently, it is less likely to include the noise generated by the switching of the switch 220 in the OFFSET signal.

Accordingly, with the image pickup apparatus of the embodiment, it is possible to reduce the noise included in a signal based on the N signal output by the pixel 150.

In the embodiment, an example has been described in which the capacitor element 260 and the capacitor element 270 perform a clamp operation prior to the NAD period. However, the operation is not essential. The AD conversion unit 1300 of the embodiment can be configured not to include the capacitor element 260 and the capacitor element 270. In that case, the digital N signal and the digital S signal also include a component of the OFFSET signal of the amplifying circuit 1100. Even in that case, the component of the offset signal of the amplifying circuit 1100 can be subtracted by subtracting the digital N signal from the digital S signal.

In the embodiment, the AD conversion performed by counting time from the start of the change in the potential of the ramp signal to the reversal of the magnitude relationship between the ramp signal and an analog signal has been described. The embodiment is not limited to the AD conversion method, and can be applied to other AD conversion methods such as those of a successive approximation type, a delta-sigma type, and a pipeline type.

In the embodiment, an example has been described in which the amplifying circuit 1100 is provided in each column. Another example will be described with reference to FIG. 5.

Figure 5:
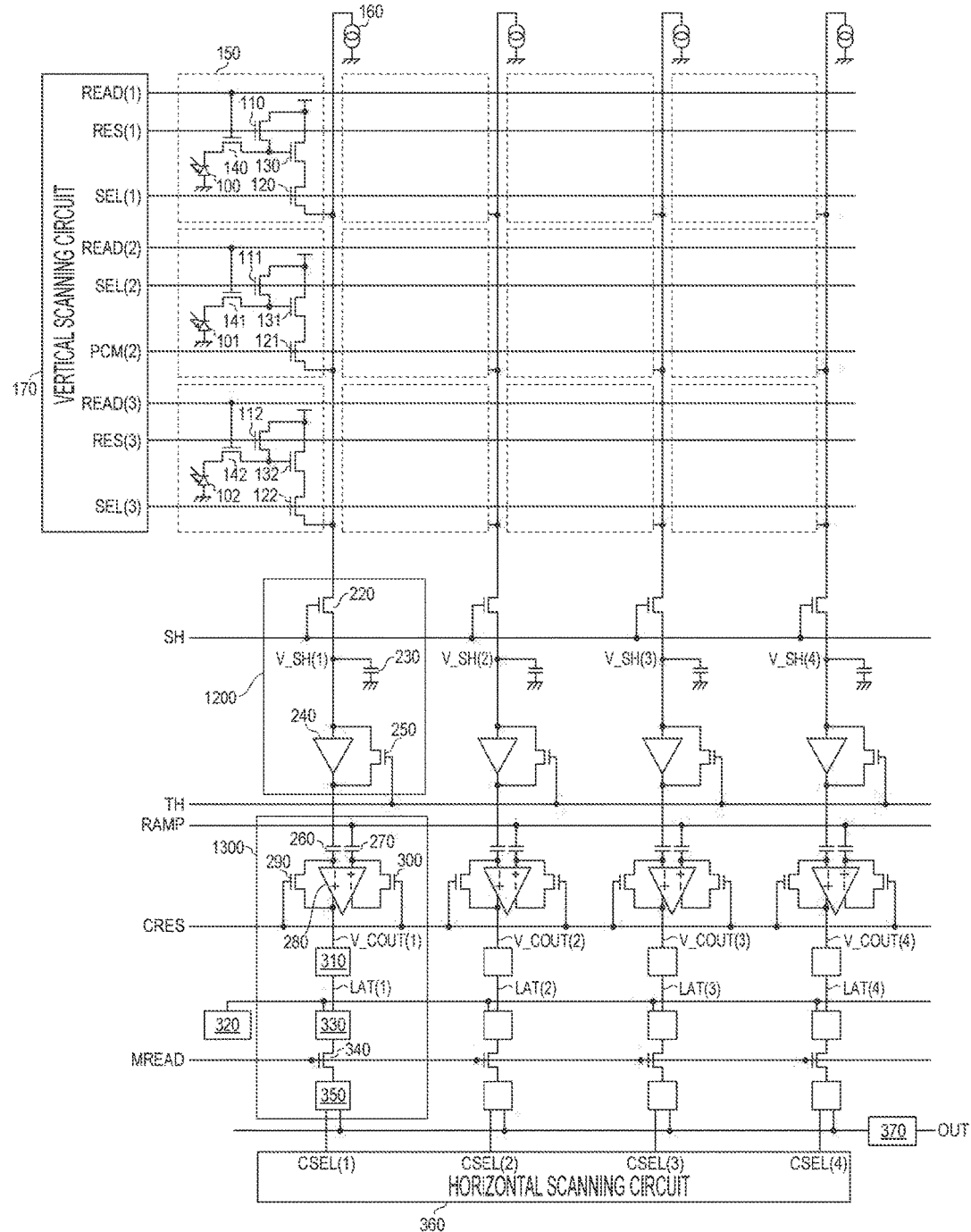
FIG. 5 illustrates an example of a configuration of an image pickup apparatus.

Respective signals illustrated in FIG. 5 correspond to the signals illustrated in the timing chart in FIG. 4. In other words, also in the image pickup apparatus in FIG. 5, the signal SH remains High over the N-reading period, the NAD period, the S-reading period, and the SAD period.

The image pickup apparatus in FIG. 5 has a configuration obtained by excluding the amplifying circuit 1100 from the image pickup apparatus illustrated in FIG. 1. Each of the N signal and the (S+N) signal output by the pixel 150 is output to the sampling and holding unit 1200. The buffer 240 outputs a signal obtained by buffering each of the N signal and the (S+N) signal output from the pixel 150 to the AD conversion unit 1300. The capacitor element 260 clamps the N signal. Consequently, a signal obtained by subtracting the N signal from the (S+N) signal is input to the inverting input node of the comparator 280. The digital N signal has a component mainly including variation in characteristics between the comparators 280 in respective columns. The digital S signal is a signal based on the S signal.

Also in the example in FIG. 5, other AD conversion methods can be applied. In addition, the capacitor element 260 and the capacitor element 270 can be omitted.

Figure 7:
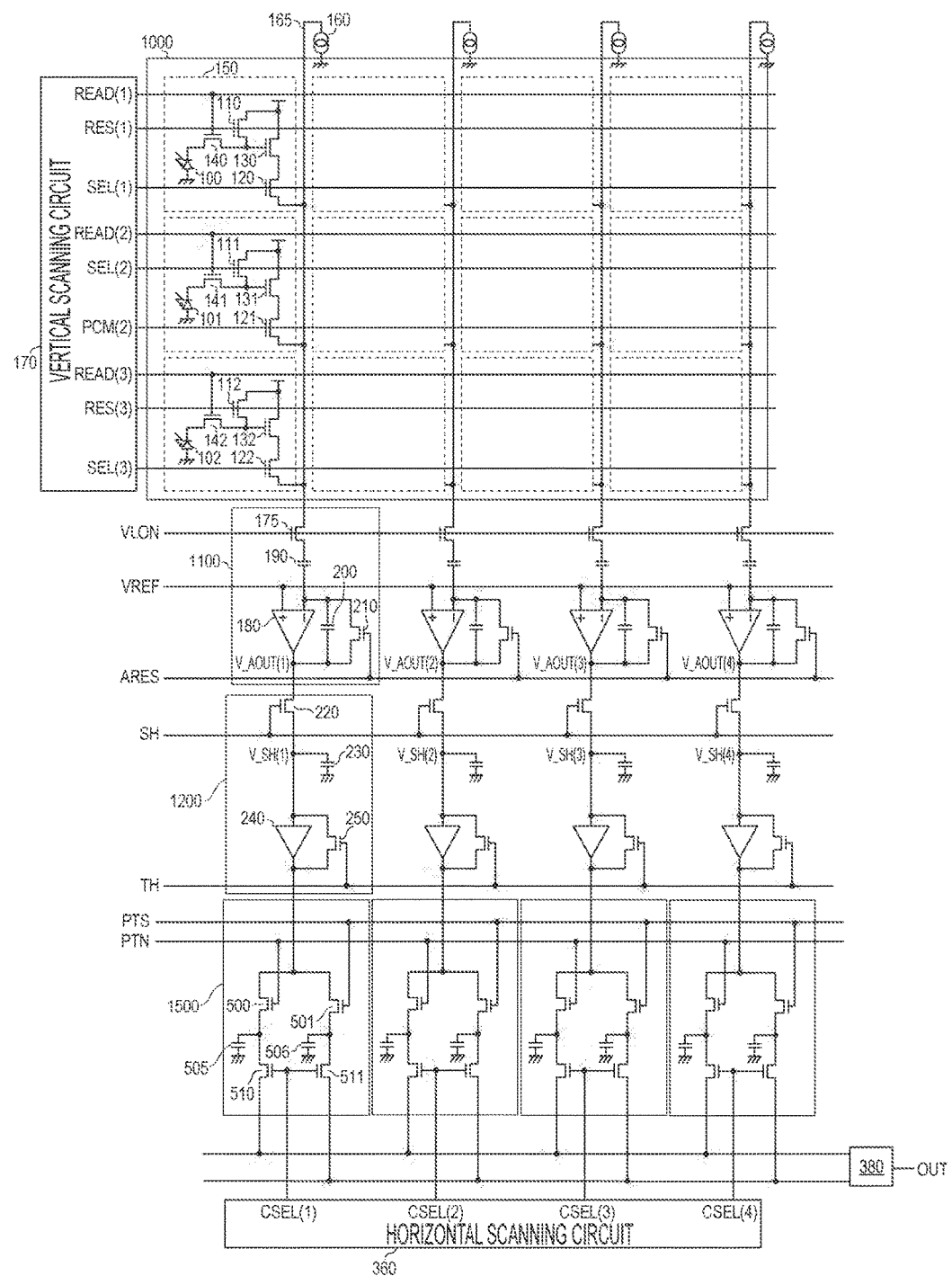
FIG. 7 illustrates an example of a configuration of an image pickup apparatus.

In the embodiment, an example has been described in which the image pickup apparatus includes the AD conversion unit 1300. There is no limitation to the example. FIG. 7 illustrates an image pickup apparatus of another mode. The image pickup apparatus in FIG. 7 includes a signal reading unit 1500 connected to an output node of the sampling and holding unit 1200. The signal reading unit 1500 includes a switch 500, a switch 501, a capacitor element 505, a capacitor element 506, a switch 510, and a switch 511. The switch 500 and the switch 501 are controlled by a signal PTS and a signal PTN output from the timing generator (not illustrated). The switch 510 and the switch 511 are controlled by a signal CSEL(m) output from the horizontal scanning circuit 360. The capacitor element 505 holds an OFFSET signal output by the buffer 240. The capacitor element 506 holds an (amplified S+OFFSET) signal output by the buffer 240.

An output unit 380 outputs, as output OUT, an amplified S signal obtained by subtracting an (amplified S+OFFSET) signal and an OFFSET signal output from the signal reading unit 1500 of each column.

The driving of the embodiment can be applied also in the configuration as described above. In other words, the capacitor element 505 or the capacitor element 506 as a signal holding unit may hold the signal in the period during which the capacitor element 230 samples the signal.

Second Embodiment

In the first embodiment, the driving of FIG. 2A has been described as the comparative example. An image pickup apparatus of a second embodiment switches and performs the driving of FIG. 2A and the driving of FIG. 2B.

Figure 6:
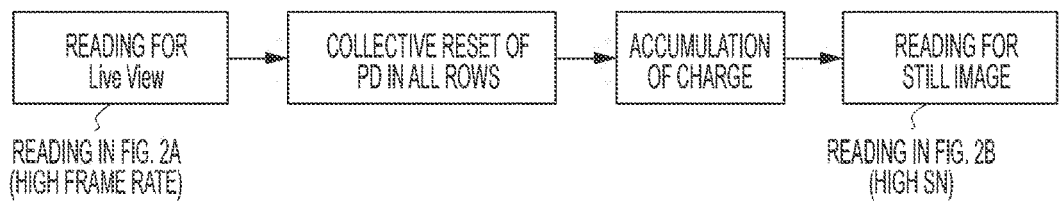
FIG. 6 illustrates an example of an operation of an image pickup apparatus.

FIG. 6 illustrates the driving of the embodiment.

The image pickup apparatus performs reading for Live View, collectively resets charges of PDs in all rows, accumulates charge, and performs reading for a still image. In Live View, an image is generated which includes several tens of frames per second. One frame in Live View corresponds to one vertical scanning in the image pickup apparatus. The one vertical scanning corresponds to reading of signals from a pixel 150 in the first row to a pixel 150 in the last row.

In the reading for Live View, reading of signals is performed at a higher frame rate than that in the reading for a still image. In the reading for Live View, the driving illustrated in FIG. 2A is performed.

On the other hand, in the reading for a still image, reading of signals with a high S/N ratio is performed. Accordingly, in the reading for a still image, the driving illustrated in FIG. 2B is performed.

As described above, when high-speed reading is performed in the image pickup apparatus, the driving illustrated in FIG. 2A is performed. On the other hand, when reading of signals with a high S/N ratio is performed in the image pickup apparatus, the driving illustrated in FIG. 2B is performed. As described above, the image pickup apparatus of the embodiment has an effect which makes it possible to perform both the high-speed reading and the reading of signals with a high S/N ratio.

Third Embodiment

A third embodiment relates to an image pickup system including the image pickup apparatus of each embodiment described above.

Figure 8:
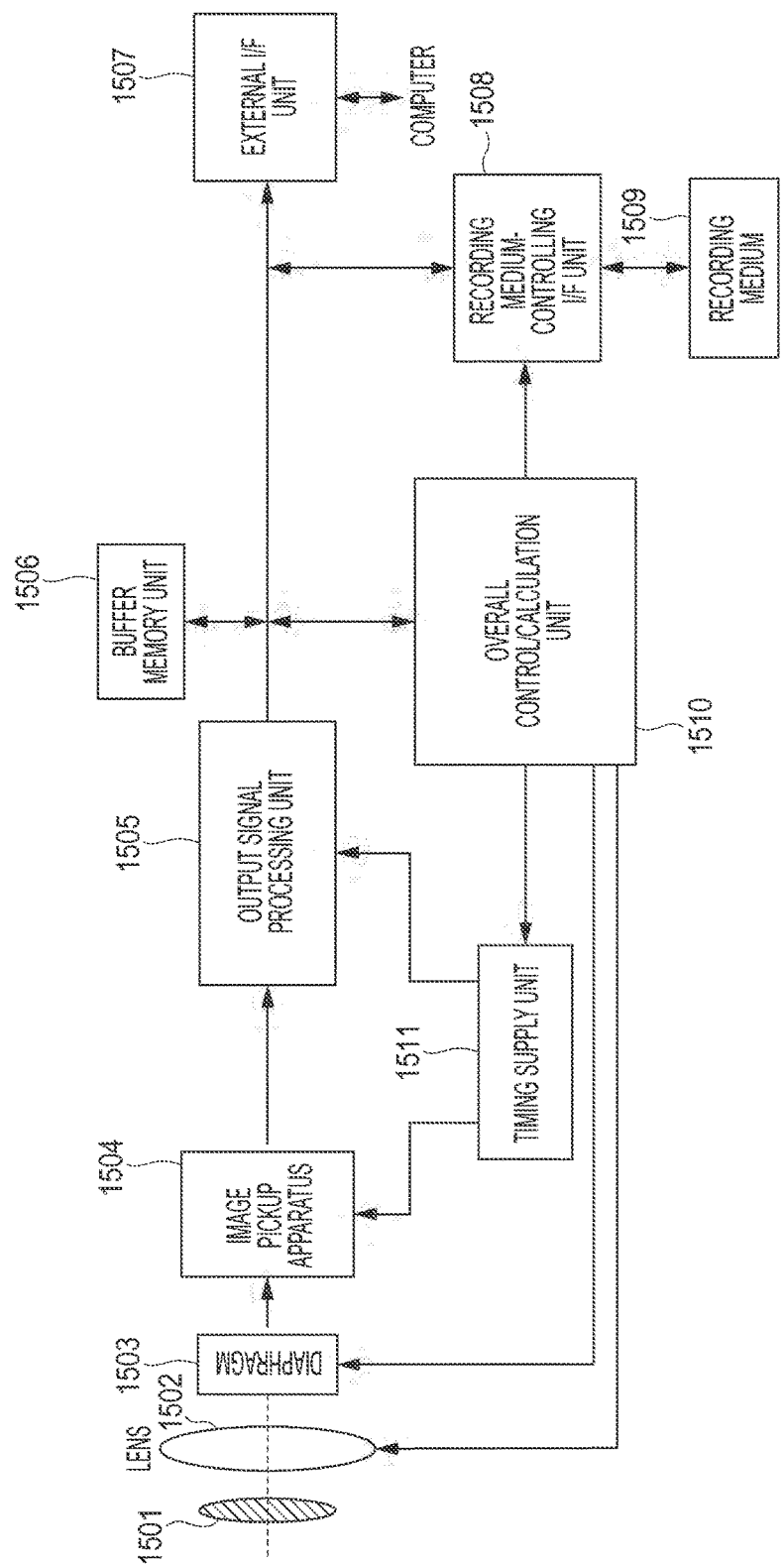
FIG. 8 illustrates an example of a configuration of an image pickup system.

Examples of the image pickup system include a digital still camera, a digital camcorder, and a monitoring camera. FIG. 8 illustrates a schematic diagram of a digital still camera to which the image pickup apparatus is applied, as an example of the image pickup system.

The image pickup system illustrated in FIG. 8 includes a barrier 1501, a lens 1502, and a diaphragm 1503. The barrier 1501 is provided for protecting a lens. The lens 1502 makes the image pickup apparatus 1504 focus an optical image of an object. The diaphragm 1503 is provided for making an amount of light passing through the lens 1502 variable. The lens 1502 and the diaphragm 1503 constitute an optical system which concentrates light to the image pickup apparatus 1504. In addition, the image pickup system illustrated in FIG. 8 includes an output signal processing unit 1505 which performs a process of an output signal output from the image pickup apparatus 1504. The output signal processing unit 1505 performs an operation to output a signal after performing various kinds of correction and compression as needed.

The image pickup system illustrated in FIG. 8 further includes a buffer memory unit 1506 and an external interface unit 1507. The buffer memory unit 1506 is provided for temporarily storing image data. The external interface unit 1507 is provided for communicating with an external computer or the like. The image pickup system further includes a recording medium 1509 capable of connecting thereto and disconnecting therefrom such as a semiconductor memory and a recording medium-controlling interface unit 1508. The recording medium 1509 is provided for recording or reading image data. The recording medium-controlling interface unit 1508 is provided for performing recording or reading with respect to the recording medium 1509. The image pickup system further includes an overall control/calculation unit 1510 and a timing supply unit 1511. The overall control/calculation unit 1510 controls various calculations and the entire digital still camera. The timing supply unit 1511 outputs various timing signals to the image pickup apparatus 1504 and the output signal processing unit 1505. Here, the timing signals and the like may be input from outside, and the image pickup system may include at least the image pickup apparatus 1504 and the output signal processing unit 1505 which processes an output signal output from the image pickup apparatus 1504.

As described above, the image pickup system of the embodiment can perform an image-pickup operation by applying the image pickup apparatus 1504.

Each of the embodiments described above is represented only as an exemplary embodiment for implementing the disclosure, and the technical scope of the disclosure should not be restrictively interpreted by the embodiments. In other words, the disclosure can be implemented in various forms without departing from the technical idea or the main feature thereof. In addition, the disclosure can be implemented by combining each of the embodiments described above in various ways.

The aspect of the embodiments makes it possible to reduce a noise of a signal held by a signal holding unit.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-241382, filed Dec. 10, 2015, which is hereby incorporated by reference herein in its entirety.

What is claimed is:

1. An image pickup apparatus comprising:
a plurality of pixels, each of the pixels being configured to output a pixel signal;
a signal line to which each of the pixels outputs the pixel signal;
a capacitor element;
a signal holding unit; and
a switch having one node connected to the signal line and another node connected to the capacitor element and the signal holding unit,
wherein
the capacitor element samples the pixel signal when the switch is turned on, and holds the pixel signal when the switch is turned off,
the pixel signal of a first pixel among the pixels is output to the signal line, and
a signal based on the pixel signal of the first pixel sampled by the capacitor element by turning the switch on is held by the signal holding unit with the switch left turned on.

2. The image pickup apparatus according to claim 1, wherein
the image pickup apparatus operates by a first operation and a second operation,
in the first operation, the signal based on the pixel signal of the first pixel sampled by the capacitor element is held by the signal holding unit with the switch left turned on, and
in the second operation, by turning the switch to off, the capacitor element holds the pixel signal of the first pixel, and the signal holding unit holds the signal based on the pixel signal of the first pixel held by the capacitor element.

3. The image pickup apparatus according to claim 2, wherein
in the second operation,
in a period during which the signal holding unit holds the signal based on the pixel signal of the first pixel held by the capacitor element and during which the switch is turned off, the pixel signal of a second pixel among the pixels is output to the signal line.

4. The image pickup apparatus according to claim 2, wherein
each of the pixels has a photoelectric conversion unit configured to accumulate charge and an amplifying transistor configured to include an input node to which the charge is transferred,
the pixel signal includes a noise signal based on a reset potential of the input node and an optical signal based on a potential of the input node to which the charge has been transferred, and
in the second operation,
in a period during which the signal holding unit holds a signal based on the noise signal of the first pixel held by the capacitor element and during which the switch is turned off, the optical signal of the first pixel is output to the signal line.

5. The image pickup apparatus according to claim 1, further comprising:
an amplifying circuit having an input node connected to the capacitor element and an output node connected to the signal holding unit, wherein
the signal based on the pixel signal is a signal output by the amplifying circuit.

6. The image pickup apparatus according to claim 2, further comprising an amplifying circuit having an input node connected to the capacitor element and an output node connected to the signal holding unit, wherein
the signal based on the pixel signal is a signal output by the amplifying circuit.

7. The image pickup apparatus according to claim 3, further comprising an amplifying circuit having an input node connected to the capacitor element and an output node connected to the signal holding unit, wherein
the signal based on the pixel signal is a signal output by the amplifying circuit.

8. The image pickup apparatus according to claim 4, further comprising an amplifying circuit having an input node connected to the capacitor element and an output node connected to the signal holding unit, wherein
the signal based on the pixel signal is a signal output by the amplifying circuit.

9. The image pickup apparatus according to claim 1, further comprising an AD conversion unit configured to include the signal holding unit, wherein
the AD conversion unit converts the signal based on the pixel signal to a digital signal, and
the signal holding unit holds the digital signal.

10. The image pickup apparatus according to claim 2, further comprising an AD conversion unit configured to include the signal holding unit, wherein
the AD conversion unit converts the signal based on the pixel signal to a digital signal, and
the signal holding unit holds the digital signal.

11. The image pickup apparatus according to claim 8, further comprising an AD conversion unit configured to include the signal holding unit, wherein
the AD conversion unit converts the signal based on the pixel signal to a digital signal, and
the signal holding unit holds the digital signal.

12. The image pickup apparatus according to claim 2, further comprising an AD conversion unit configured to include the signal holding unit, wherein
the AD conversion unit converts the signal based on the pixel signal to a digital signal,
the signal holding unit holds the digital signal, and
in the second operation,
in a period during which the AD conversion unit converts the signal based on the pixel signal of the first pixel held by the capacitor element to a digital signal and during which the switch is turned off, the pixel signal of a second pixel among the pixels is output to the signal line.

13. The image pickup apparatus according to claim 1, wherein one node of the capacitor element is connected to the other node of the switch, and a reference voltage is input to another node of the capacitor element.

14. An image pickup system comprising:
an image pickup apparatus; and
a signal processing unit configured to generate an image by a signal output by the image pickup apparatus, wherein
the image pickup apparatus comprises:
a plurality of pixels, each of the pixels being configured to output a pixel signal;
a signal line to which each of the pixels outputs the pixel signal;
a capacitor element;
a signal holding unit; and
a switch having one node connected to the signal line and another node connected to the capacitor element and the signal holding unit, wherein the capacitor element samples the pixel signal when the switch is turned on, and holds the pixel signal when the switch is turned off, the pixel signal of a first pixel among the pixels is output to the signal line, and a signal based on the pixel signal of the first pixel sampled by the capacitor element by turning the switch on is held by the signal holding unit with the switch left turned on.

15. A method for driving an image pickup apparatus, the image pickup apparatus comprising:
   a plurality of pixels, each of the pixels being configured to output a pixel signal;
   a signal line to which each of the pixels outputs the pixel signal; a capacitor element; and
   a signal holding unit configured to hold a signal based on the pixel signal,
   the capacitor element being capable of sampling the pixel signal and holding the pixel signal, wherein
   a first pixel among the pixels outputs the pixel signal to the signal line, and
   in a period during which the capacitor element samples the pixel signal of the first pixel, the signal holding unit holds a signal based on the pixel signal of the first pixel.

16. The method for driving an image pickup apparatus according to claim 15, wherein
   the image pickup apparatus performs a first operation and a second operation,
   in the first operation, in a period during which the capacitor element samples the pixel signal of the first pixel, the signal holding unit holds the signal based on the pixel signal of the first pixel, and
   in the second operation, the capacitor element holds the pixel signal of the first pixel, and the signal holding unit holds the signal based on the pixel signal of the first pixel held by the capacitor element.

17. The method for driving an image pickup apparatus according to claim 16, wherein
   in the second operation,
   in a period during which the signal holding unit holds the signal based on the pixel signal of the first pixel held by the capacitor element and during which the capacitor element holds the pixel signal of the first pixel, the pixel signal of a second pixel among the pixels is output to the signal line.

18. The method for driving an image pickup apparatus according to claim 16, wherein
   each of the pixels has a photoelectric conversion unit configured to accumulate charge and an amplifying transistor configured to include an input node to which the charge is transferred,
   the pixel signal includes a noise signal based on a reset potential of the input node and an optical signal based on a potential of the input node to which the charge has been transferred, and
   in the second operation,
   in a period during which the signal holding unit holds a signal based on the noise signal of the first pixel held by the capacitor element and during which the capacitor element holds the noise signal of the first pixel, the optical signal of the first pixel is output to the signal line.

19. The method for driving an image pickup apparatus according to claim 15, the image pickup apparatus further comprising:
   an amplifying circuit having an input node connected to the capacitor element and an output node connected to the signal holding unit, wherein
   the signal based on the pixel signal is a signal output by the amplifying circuit.

20. The method for driving an image pickup apparatus according to claim 16, the image pickup apparatus further comprising an amplifying circuit having an input node connected to the capacitor element and an output node connected to the signal holding unit, wherein
   the signal based on the pixel signal is a signal output by the amplifying circuit.

* * * * *